US007055023B2

(12) United States Patent
Tago et al.

(10) Patent No.: US 7,055,023 B2
(45) Date of Patent: May 30, 2006

(54) APPARATUS AND METHOD FOR BRANCH PREDICTION WHERE DATA FOR PREDICTIONS IS SELECTED FROM A COUNT IN A BRANCH HISTORY TABLE OR A BIAS IN A BRANCH TARGET BUFFER

(75) Inventors: Shinichiro Tago, Kawasaki (JP); Tomohiro Yamana, Kawasaki (JP); Yoshimasa Takebe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 223 days.

(21) Appl. No.: 10/091,147

(22) Filed: Mar. 6, 2002

(65) Prior Publication Data
US 2002/0199091 A1    Dec. 26, 2002

(30) Foreign Application Priority Data
Jun. 20, 2001    (JP) .............................. 2001-186473

(51) Int. Cl.
*G06F 9/32*    (2006.01)
(52) U.S. Cl. ...................................... 712/240
(58) Field of Classification Search ................ 712/238, 712/239, 240, 236
See application file for complete search history.

(56) References Cited

U.S. PATENT DOCUMENTS

| 5,761,723 A | * | 6/1998 | Black et al. ................. 711/144 |
| 5,822,577 A | | 10/1998 | Ekanadham et al. ......... 712/240 |
| 5,864,697 A | * | 1/1999 | Shiell .......................... 712/240 |
| 5,935,241 A | * | 8/1999 | Shiell et al. ................. 712/240 |
| 5,995,749 A | * | 11/1999 | Tran ............................ 712/239 |
| 6,101,595 A | * | 8/2000 | Pickett et al. ............... 712/205 |
| 6,108,775 A | * | 8/2000 | Shiell et al. ................. 712/240 |
| 6,247,122 B1 | * | 6/2001 | Henry et al. ................ 712/239 |
| 6,374,349 B1 | * | 4/2002 | McFarling ................... 712/239 |
| 6,421,774 B1 | * | 7/2002 | Henry et al. ................ 712/239 |
| 6,516,409 B1 | * | 2/2003 | Sato ............................ 712/239 |
| 6,526,502 B1 | * | 2/2003 | Col et al. .................... 712/239 |
| 6,550,004 B1 | * | 4/2003 | Henry et al. ................ 712/239 |
| 6,687,789 B1 | * | 2/2004 | Keller et al. ................ 711/128 |

FOREIGN PATENT DOCUMENTS

| DE | 199 26 580 A1 | 1/2000 |
| WO | 00/14628 | 3/2000 |
| WO | 00/43869 | 7/2000 |

* cited by examiner

OTHER PUBLICATIONS

European Search Report dated Nov. 17, 2005 for application No. 02251556.3 - 2211 (3 pages).

*Primary Examiner*—Eric Coleman
(74) *Attorney, Agent, or Firm*—Staas & Halsey LLP

(57) ABSTRACT

An apparatus for branch prediction includes a history register which stores therein history of previous branch instructions, an index generation circuit which generates a first index from an instruction address and the history stored in the history register, a history table which stores therein a portion of the instruction address as a tag and a first value indicative of likelihood of branching in association with the first index, a branch destination buffer which stores therein a branch destination address or predicted branch destination address of an instruction indicated by the instruction address and a second value indicative of likelihood of branching in association with a second index that is at least a portion of the instruction address, and a selection unit which makes a branch prediction by selecting one of the first value and the second value.

11 Claims, 6 Drawing Sheets

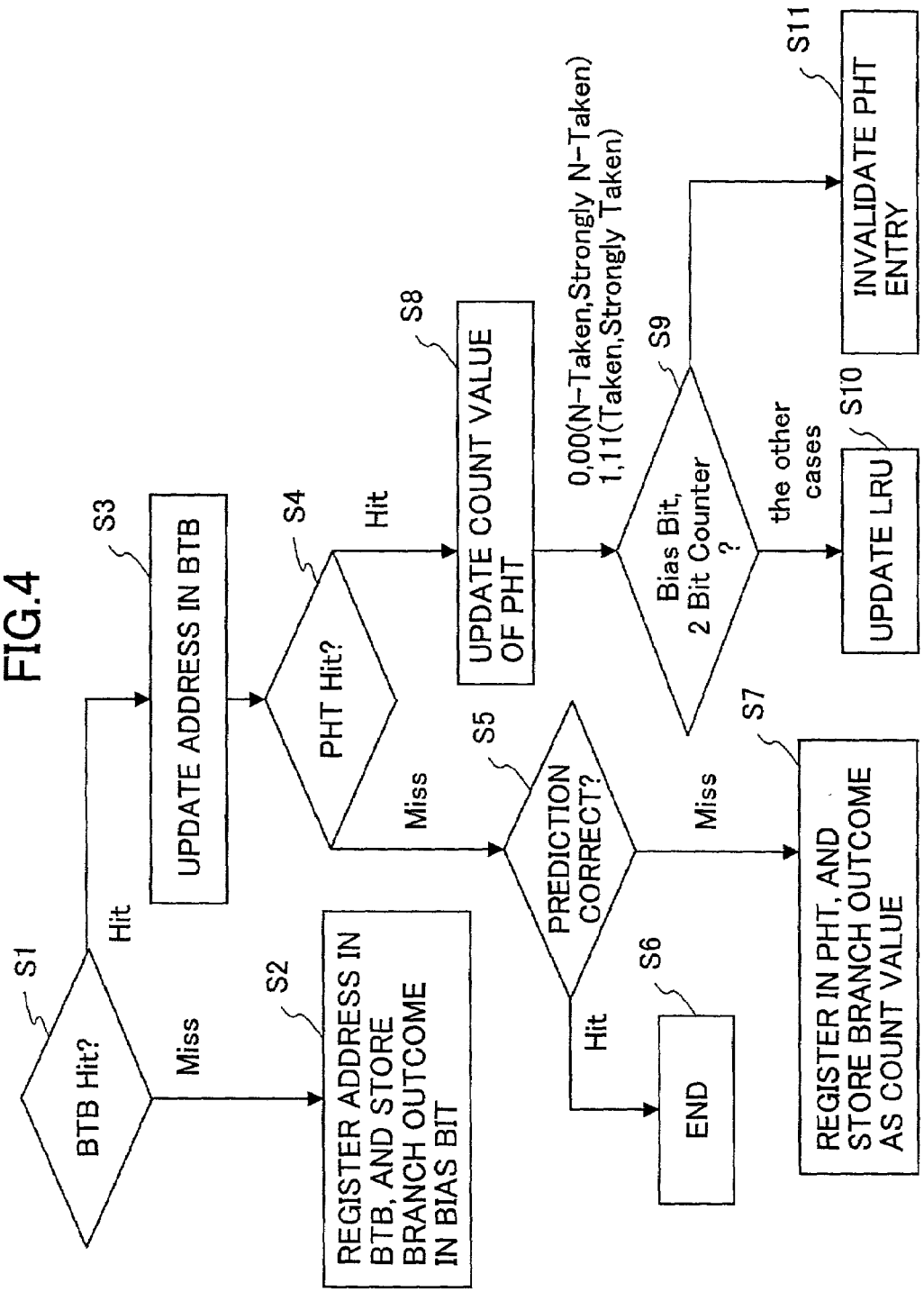

FIG.5

| ADDRESS | INSTRUCTION |
|---------|-------------|
| 000000 | ARITHMETIC / LOGIC OPERATION INSTRUCTION |
| 000001 | BRANCH INSTRUCTION, BRANCHING TO 000011 |
| 000010 | ARITHMETIC / LOGIC OPERATION INSTRUCTION |
| 000011 | ARITHMETIC / LOGIC OPERATION INSTRUCTION |
| 000100 | BRANCH INSTRUCTION |
| 000101 | BRANCH INSTRUCTION |
| 000110 | BRANCH INSTRUCTION |
| 000111 | BRANCH INSTRUCTION |
| 001000 | BRANCH INSTRUCTION |
| 001001 | ARITHMETIC / LOGIC OPERATION INSTRUCTION |
| 001010 | ARITHMETIC / LOGIC OPERATION INSTRUCTION |
| 001011 | ARITHMETIC / LOGIC OPERATION INSTRUCTION |
| 001100 | BRANCH INSTRUCTION, BRANCHING TO 001001 (BRANCHING FIVE TIMES, FOLLOWED BY NO BRANCHING) |
| 001101 | ARITHMETIC / LOGIC OPERATION INSTRUCTION |
| 001110 | ARITHMETIC / LOGIC OPERATION INSTRUCTION |
| 001111 | BRANCH INSTRUCTION, BRANCHING TO 000010 |
| 010000 | ARITHMETIC / LOGIC OPERATION INSTRUCTION |

APPARATUS AND METHOD FOR BRANCH PREDICTION WHERE DATA FOR PREDICTIONS IS SELECTED FROM A COUNT IN A BRANCH HISTORY TABLE OR A BIAS IN A BRANCH TARGET BUFFER

BACKGROUND OF THE INVENTION

1. Field of the Invention

The present invention generally relates to methods of predicting branching of branch instructions and processors employing such methods, and particularly relates to a method of predicting branching of branch instructions based on PHT (pattern history table) and a processor employing such a method.

2. Description of the Related Art

In processors based on pipeline operations, waiting for branch results to be known before jumping to branch addresses results in the delay of instruction fetch timing, causing disturbance in the pipeline operation. It is thus necessary to predict branching before actually executing branch instructions, thereby making it possible to fetch instructions in a continuous stream in accordance with the pipeline operations.

Branch instructions often have locally lopsided tendency in branch directions such that a given branch direction, of itself, is likely to branch or is not likely to branch. Further, branch directions may often have globally lopsided tendency in branch directions such that a given branch instruction is likely to branch or is not likely to branch depending on the branching results of recently executed branch instructions. A PHT (pattern history table) provides a highly accurate prediction by taking into account the local tendency and the global tendency in branch directions.

FIG. 1 is a block diagram showing a configuration of a related-art branch prediction mechanism based on the PHT.

The branch prediction mechanism of FIG. 1 includes an XOR circuit 11, a GHR unit 12, and a PHT unit 13. The GHR (global history register) unit 12 is a register that stores therein the history of recently executed branch instructions as to whether or not they branched. When a given branch instruction branches, the contents of the register is shifted one bit to the left, with "1" being inserted into the least significant bit. When a given branch instruction does not branch, the contents of the register is shifted one bit to the left, with "0" being inserted into the least significant bit. For example, the GHR unit 12 may be 6 bits in length, and the current contents thereof are "011001". If the execution of a given branch operation results in branching, the contents of the GHR unit 12 is shifted one bit to the left, and "1" is inserted into the least significant bit. As a result, the contents of the GHR unit 12 in this case becomes "110011". "110011" indicates branching taking place 6 branch instructions ago, branching taking place 5 branch instructions ago, no branching taking place 4 branch instructions ago, no branching taking place 3 branch instructions ago, branching taking place 2 branch instructions ago, and branching taking place for the last branch instruction.

The XOR circuit 11 performs an Exclusive-OR operation between the contents of the GHR unit 12 and a branch instruction address that is indicated by a program counter 10 as a next instruction to be executed. The obtained Exclusive-OR value is supplied to the PHT unit 13 as an index.

The PHT unit 13 is a RAM (random access memory) that stores therein a count value for each index where the count value may be comprised of 2 bits, for example. Each index is an Exclusive-OR value between the contents of the GHR unit 12 and a branch instruction address indicated by the program counter 10. The 2-bit count value that is an entry corresponding to each index is a prediction used when the corresponding index is hit. When the count value is 0 or 1, branching is predicted. When the count value is 2 or 3, no branching is predicted.

If the contents of the GHR unit 12 are "110011", and the branch instruction address is "001000", for example, the index will be "111011". The 2-bit count value corresponding to this index "111011" is referred to, and may be found to be 2, for example. Since the count value being 2 or 3 indicates branching as described above, the branch instruction at the instruction address "001000" to be executed is expected to branch according to the prediction. If the instruction actually branches as a result of actual execution thereof, the count value is incremented by 1. If the instruction does not branch as a result of actual execution thereof, the count value is decreased by 1. Accordingly, the count value will be 3 in the case of actual branching of the instruction.

After this, the branch instruction at the same branch instruction address "001000" may be executed again while the GHR unit 12 has the same contents "110011" as before. In this case, the index will be "111011", which is the same as before. Since the count value is 3, it is predicted that the branch instruction will branch. As previously described, the contents of the GHR unit 12 are the history of outcomes of recently executed branch instructions. As a result, if the same branch instruction is executed under the same conditions of recent branch outcomes, the branch result is accumulated in the same index. When the same index is referred to on a next occasion, the count value accumulated in this manner will be used for branch prediction.

The contents of the GHR unit 12 may be "110010", for example, illustrating a case in which the history of outcomes of recently executed branch operations is slightly different from the history of the previous example. This corresponds to a case in which the outcome of the last branch instruction is different from "110011". When the branch instruction at the same branch instruction address "001000" is to be executed, the index will be "111010". In this manner, this index will have branch outcomes accumulated therein when the branch instruction at the branch instruction address "001000" is executed under the previous branch conditions that are indicated as the history "110010".

Accordingly, if only one branch instruction is present in a program, indexes will accumulate the outcomes of this single branch instruction with respect to respective branch histories. This achieves a highly accurate prediction by taking into account each one of the branch histories. If more than one branch instruction is present in a program, however, the outcomes of different branch instructions interfere with each other in the PHT unit 13, thereby degrading prediction accuracy. For example, if the contents of the GHR unit 12 are "111010" and the branch instruction at the branch instruction address "000001" is to be executed, the index will be "111011". This index is identical to the index that is used when the contents of the GHR unit 12 are "110011" and the branch instruction address is "001000". In this manner, the method of calculating an index by the XOR circuit 11 results in the shared use of an index by different branch instructions, which results in interference between records of branch outcomes and a resulting degradation of prediction accuracy.

In order to avoid the degradation of prediction accuracy, indexes may be generated by combining the contents of the GHR unit 12 and the contents of the program counter 10. If the contents of the GHR unit 12 is "110011" and the branch instruction address is "001000", for example, the index is generated as "110011001000". In such a configuration, however, the number of entries in the RAM of the PHT unit 13 greatly increases. As a matter of fact, the number of entries in this example increases 64 times ($=2^6$).

In the configuration in which entries in the PHT used for branch prediction interfere with each other as described above, the accuracy of branch prediction undesirably decreases. It is undesirable, however, to excessively increase the memory volume of the PHT for the purpose of improving the prediction accuracy. A desirable configuration is that which enhances the prediction accuracy as much as possible with as small a memory volume as possible.

Accordingly, there is a need for a method of and an apparatus for predicting branching based on the PHT that improves prediction accuracy as much as possible with as small a memory volume as possible by avoiding entry interference.

SUMMARY OF THE INVENTION

It is a general object of the present invention to provide a branch prediction method and a branch prediction apparatus that substantially obviate one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a branch prediction method and a branch prediction apparatus particularly pointed out in the specification in such full, clear, concise, and exact terms as to enable a person having ordinary skill in the art to practice the invention.

To achieve these and other advantages and in accordance with the purpose of the invention, as embodied and broadly described herein, an apparatus for branch prediction according to the present invention includes a history register which stores therein history of previous branch instructions, an index generation circuit which generates a first index from an instruction address and the history stored in the history register, a history table which stores therein a portion of the instruction address as a tag and a first value indicative of likelihood of branching in association with the first index, a branch destination buffer which stores therein a branch destination address or predicted branch destination address of an instruction indicated by the instruction address and a second value indicative of likelihood of branching in association with a second index that is at least a portion of the instruction address, and a selection unit which makes a branch prediction by selecting one of the first value and the second value.

In the apparatus as described above, the selection unit selects the first value if the branch destination buffer has an entry therein corresponding to a current instruction address and the history table has an entry therein corresponding to the current instruction address and current history, and selects the second value if the branch destination buffer has an entry therein corresponding to the current instruction address and the history table does not have an entry therein corresponding to the current instruction address and the current history.

In the apparatus as described above, the provision of a portion of an instruction as a tag in the history table (PHT) makes it possible to avoid interference of PHT entries between different branch instructions. When a tag does not match a current instruction upon reference to the first index, this means that information about the current instruction under the current history condition is not registered. In this case, the branch destination buffer (BTB) is used for branch prediction. Namely, the first value of the history table is used for branch prediction if the history table hits (i.e., if a tag matches), whereas the second value of the branch destination buffer is used for branch prediction if the history table misses (i.e., if a tag does not match).

In the branch prediction according to the present invention, highly accurate branch predictions can be made by avoiding entry interference, so that even when an instruction is fetched based on the prediction before a branch direction is actually determined, there is only a small possibility of miss prediction, thereby making it possible to avoid disturbance in the pipeline operation.

Other objects and further features of the present invention will be apparent from the following detailed description when read in conjunction with the accompanying drawings.

BRIEF DESCRIPTION OF THE DRAWINGS

FIG. 4 is a flowchart of a data updating process according to the present invention;

FIG. 5 is a chart showing an example of a program that includes branch instructions.

DESCRIPTION OF THE PREFERRED EMBODIMENTS

In the following, embodiments of the present invention will be described with reference to the accompanying drawings.

Figure 2:
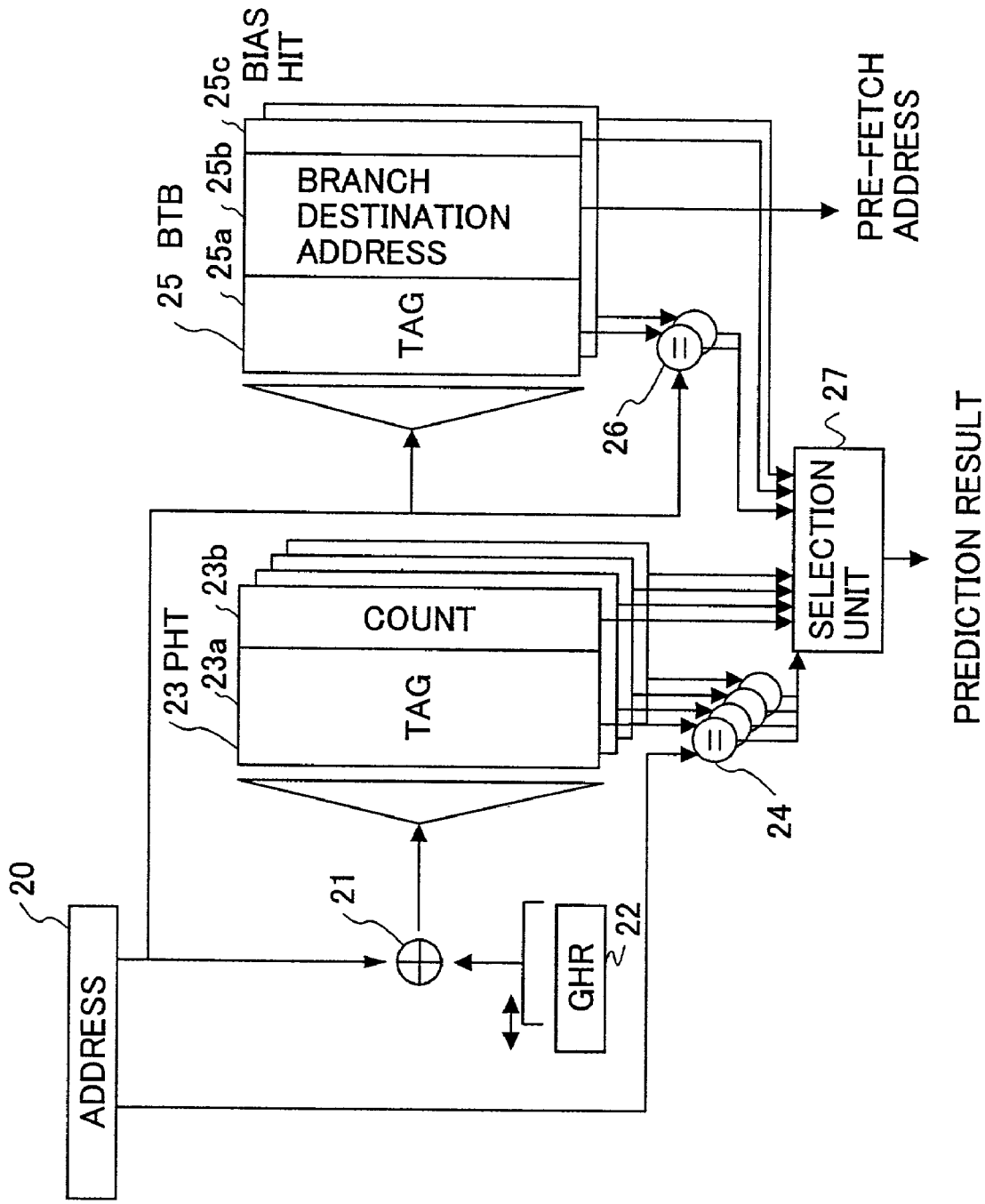
FIG. 2 is a block diagram of a branch prediction apparatus based on the use of a PHT according to the present invention.

FIG. 2 is a block diagram of a branch prediction apparatus based on the use of a PHT according to the present invention.

The branch prediction apparatus according to the present invention includes an XOR circuit 21, a GHR unit 22, a tag-attached PHT unit 23, a comparison unit 24, a BTB (branch target buffer) 25, a comparison unit 26, and a selection unit 27.

The GHR (global history register) unit 22 is a register that stores therein the history of recently executed branch instructions as to whether or not they branched. When a given branch instruction branches, the contents of the register is shifted one bit to the left, with "1" being inserted into the least significant bit. When a given branch instruction does not branch, the contents of the register is shifted one bit to the left, with "0" being inserted into the least significant bit. The XOR circuit 21 performs an Exclusive-OR operation between the contents of the GHR unit 22 and a branch instruction address that is indicated by a program counter 20 as a next instruction to be executed. The obtained Exclusive-OR value is supplied to the tag-attached PHT unit 23 as an index.

The tag-attached PHT unit 23 is a RAM that stores therein a tag 23a and a count value 23b with respect to each index that is an output of the XOR circuit 21. The BTB unit 25 is a RAM that stores therein a tag (a portion of an instruction address) 25a, a branch destination address 25b of a branch instruction, and a bias bit 25c in association with an index that is a portion of the instruction address).

The BTB unit 25 is used in the related-art branch prediction mechanism, and is provided for the purpose of providing a branch destination address promptly upon the prediction that the branch instruction will branch. A branch destination address can generally be computed when decoding and executing the fetched branch address, so that it takes time to identify the branch destination address. The BTB stores therein branch destination addresses with respect to respective branch instructions, thereby making it possible to read a branch destination address immediately from the BTB upon the prediction that the branch instruction will branch. In order to keep the memory volume of the BTB small, a portion of an instruction address is used as an index, and a remaining portion is used as a tag, which is stored as one of the entries of the corresponding index.

When an instruction address is supplied from the program counter 20, a tag 25a is read from an index corresponding to this instruction address. The retrieved tag 25a is compared with a corresponding portion of the supplied instruction address. If the comparison indicates a match ("hit"), it is learned that a branch instruction of this instruction address is registered, so that the branch destination address 25b associated with this index is used as a pre-fetch address.

The bias bit 25c indicates the likelihood of a given branch instruction branching (or not branching). When this bias bit 25c is comprised of 1 bit, "1" indicates that it is likely to branch, and "0" indicates that it is not likely to branch, for example. The bias bit 25c corresponds to information about local tendency in branch directions that indicates the likelihood of branching with respect to the branch instruction itself.

The tag-attached PHT unit 23 uses as an index the Exclusive-OR value between the portion of the instruction address and the contents of the GHR unit 22 obtained by the XOR circuit 21, and stores therein information about past branch outcomes as the count value 23b. In the present invention, the tag-attached PHT unit 23 stores therein not only the count value 23b but also a portion of the instruction address as a tag 23a.

When the XOR circuit 21 obtains an index from the instruction address of the program counter 20 and the contents of the GHR unit 22, the tag 23a is read from the tag-attached PHT unit 23, and is compared with a corresponding portion of the instruction address. This comparison is performed by the comparison unit 24. If the comparison indicates a match ("hit"), it is ascertained that the tag-attached PHT unit 23 has a registered entry of the information about the branch instruction of this instruction address under the condition of history indicated by the contents of the GHR unit 22. In this case, the count value 23b stored in association with the index is used for branch prediction. The count value 23b is stored in a 2-bit counter, for example. The count value being 0 or 1 predicts no branching, and the count value being 2 or 3 predicts branching.

The provision of the tag 23a makes it possible to avoid interference of PHT entries between different branch instructions. When a given index is referred to, and the tag 23a does not match the current instruction ("miss"), information about this instruction under the condition of relevant history is not registered. In this case, the present invention uses the bias bit 25c of the BTB unit 25 for branch prediction.

Namely, if the tag-attached PHT unit 23 provides a hit (i.e., if the tag matches), the count value 23b of the tag-attached PHT unit 23 is used for branch prediction. If access to the tag-attached PHT unit 23 results in a miss (i.e., if the tag does not match), the bias bit 25c of the BTB unit 25 is used for branch prediction. This selection is performed by the selection unit 27. The selection unit 27 detects whether the tag-attached PHT unit 23 hits based on the comparison made by the comparison unit 24. Based on this detection, the comparison unit 24 selects the count value 23b of the tag-attached PHT unit 23 or the bias bit 25c of the BTB unit 25, and makes branch prediction based on the selected data, followed by outputting a branch prediction result. If the BTB unit 25 does not hit, a prediction result that indicates no branching without exception will be output since the branch destination address 25b is not available.

Figure 3:
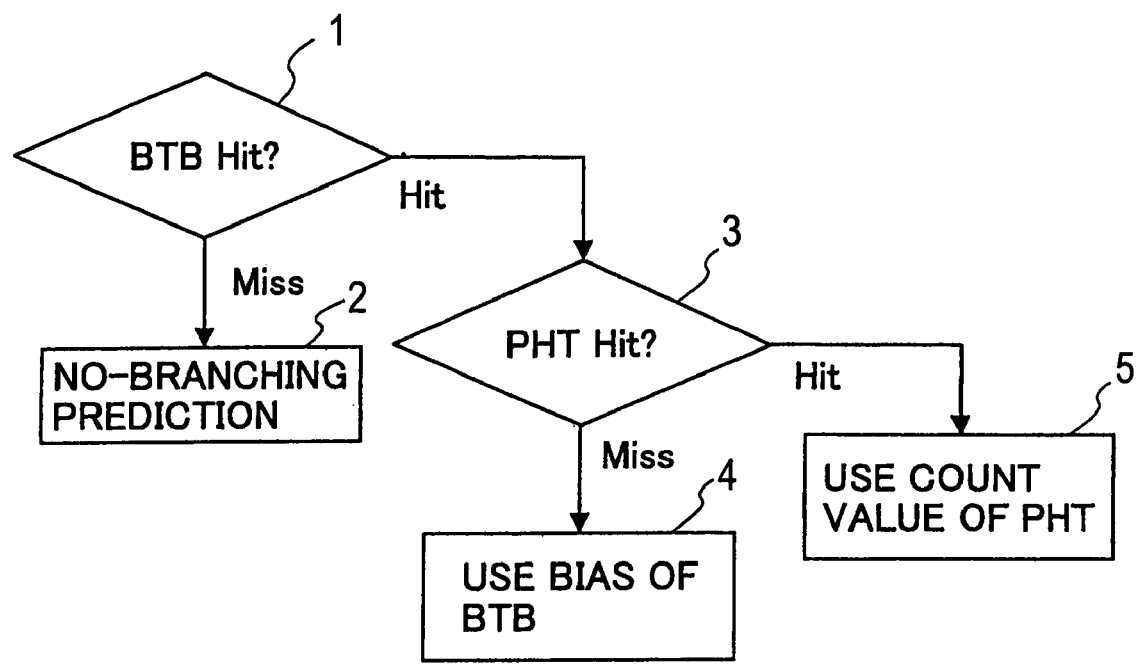
FIG. 3 is a flowchart of branch prediction according to the present invention.

FIG. 3 is a flowchart of branch prediction according to the present invention.

At step 1, a check is made as to whether the BTB unit 25 hits. If it hits, the procedure goes to step 3. In the case of a miss, the procedure goes to step 2.

At step 2, since the BTB unit 25 does not hit and the branch destination address 25b is not available, a prediction that there will no branching is made.

At step 3, a check is made as to whether the tag-attached PHT unit 23 hits. If it hits, the procedure goes to step 5, in the case of a miss, the procedure goes to step 4.

At step 4, a branch prediction is made based on the bias bit 25c of the BTB unit 25.

At step 5, a branch prediction is made based on the count value 23b of the tag-attached PHT unit 23.

FIG. 4 is a flowchart of a data updating process according to the present invention.

At step S1, a check is made as to whether the BTB unit 25 hits. If it hits, the procedure goes to step S3. In the case of a miss, the procedure goes to step S2.

At step S2, the instruction address that did not hit is registered in the BTB unit 25 together with the branch destination address. In this case, the outcome of the actually executed instruction as to whether it branched is stored as the bias bit 25c in the BTB unit 25. That is, as a result of actual execution of the instruction, "1" is stored as the bias bit 25c in the case of branching, and "0" is stored as the bias bit 25c in the case of no branching.

At step S3, since access to the BTB unit 25 hits, the relevant instruction address in the BTB unit 25 is updated.

At step S4, a check is made as to whether access to the tag-attached PHT unit 23 hits. If it hits, the procedure goes to step S8. In the case of a miss, the procedure proceeds to step S5.

At step S5, a check is made as to whether an actual branch direction upon the actual execution of the instruction matches the branch prediction. In this case, the branch prediction was made based on the bias bit 25c of the BTB unit 25 since access to the tag-attached PHT unit 23 has missed. If the check indicates a match, the procedure goes to step S6. Otherwise, the procedure goes to step S7.

At step S6, the procedure comes to an end without taking any further action. This is because it is fair to assume that the present branch prediction is proper if the result of branch prediction matches the outcome of an actual branch operation.

At Step S7, information about the instruction under the current history condition is registered in the tag-attached PHT unit 23. Namely, under the relevant index, the tag 23a of the instruction address is stored, and the actual branch outcome is stored as the count value 23b. In the case of branching, 2 ("10") is stored, and, in the case of no branching, 1 ("01") is stored, for example. This operation is performed because it is fair to determine that the current branch prediction based on the bias bit 25c of the BTB unit 25 is not proper if the result of branch prediction does not match the outcome of an actual branch operation.

At step S8, since access to the tag-attached PHT unit 23 hits, the count value 23b of the tag-attached PHT unit 23 is updated. In detail, the count value 23b is incremented by 1 in the case of actual execution having resulted in branching, and is decreased by 1 in the case of the actual execution having resulted in no branching. If the count value 23b is already its maximum value (e.g., 3 in the case of a 2-bit counter), the count value 23b stays unchanged even if the outcome of actual execution results in branching. If the count value 23b is already its minimum value (e.g., 0), the count value 23b stays unchanged even if actual execution results in no branching.

At step S9, each of the bias bit 25c of the BTB unit 25 and the count value 23b of the tag-attached PHT unit 23 is checked. If the bias bit 25c and the count value 23b are respectively 0 and 0 ("00") or are 1 and 3 ("11"), the procedure goes to step S11. Otherwise, the procedure proceeds to step S10.

At step S10, an LRU bit or the like is updated. Here, the LRU bit is attached to each entry of the tag-attached PHT unit 23, and indicates the entry that has not been used for the longest period of time since the last access. Each time the tag-attached PHT unit 23 is used for branch prediction, this LRU bit is updated. The significance of the LRU bit will be described later.

At step S11, the relevant entry of the tag-attached PHT unit 23 is invalidated. That is, the relevant entry of the tag-attached PHT unit 23 is deleted, or is deleted in effect. If the count value 23b of the tag-attached PHT unit 23 strongly indicates a particular branch direction, and if the bias bit 25c of the BTB unit 25 also indicates the same branch direction, the same branch prediction will be obtained even when the bias bit 25c of the BTB unit 25 is used for branch prediction. In this case, the deletion of a relevant entry from the tag-attached PHT unit 23 achieves efficient use of memory space in the RAM of the tag-attached PHT unit 23.

In this manner, the data updating process of the present invention is performed.

In the following, a set associative method according to the present invention will be described.

In the present invention, more than one tag-attached PHT unit 23 may be provided as shown in FIG. 2. The provision of a plurality of the tag-attached PHT units 23 makes it possible to store a plurality of entries for a single index. In a four-way set associative configuration having 4 sets of PHTs, as many as four entries can be stored with respect to a single index.

When a set associative configuration is employed, it is necessary to determine which entry should be deleted at the time of data updating. If a fifth entry needs to be stored when four entries are already in use in the four-way set associative configuration, it is necessary to select and delete one of the four entries. At step S7 of FIG. 4, for example, information about the instruction under the current history condition is registered in the tag-attached PHT unit 23, one of the existing entries needs to be deleted and replaced by a new entry if the relevant index is already filled with entries.

The LRU bit, which was described in connection with step S10 of FIG. 4, is used to identify the entry to be replaced when an existing entry needs to be replaced by a new entry. The LRU bit is provided for each entry, and indicates the order at which entries were referred to. By checking this LRU bit, an entry that has not been used for the longest period of time since the last access thereto can be identified and replaced by a new entry.

The use of a LRU bit is only an example of various methods that can be used to identify an entry to be replaced. Other methods include, but are not limited to, an LFU (least frequently used) method that replaces an entry of the least frequent use, an FIFO (first-in first-out) method that replaces an entry that is the oldest to be registered, and a random method that replaces a randomly selected entry.

In the case in which only one tag-attached PHT unit 23 is provided without use of a set associative method, each index allows only one entry to be stored. When new information needs to be registered in the tag-attached PHT unit 23 in such a case, an existing entry is deleted and replaced by a new entry if the existing entry is another instruction address registered under the currently referenced index.

As shown in FIG. 2, a set associative method may also be used with respect to the BTB unit 25.

In the following, branch prediction according to the present invention will be described with reference to a specific program example.

FIG. 5 is a chart showing an example of a program that includes branch instructions.

The length of the GHR unit 22 is 6 bits, which are initially set to "000000".

When access is made to the BTB unit 25 under the index "0001" at the time of executing an instruction at the instruction address "000001", a tag miss is detected, and, thus, no branching is predicted. This corresponds to step S2 of FIG. 3. As a result of actual execution of the instruction, the branch instruction branches, being contrary to the prediction. A tag "00", a bias "1", and a branch destination address "000011" are registered in the BTB unit 25 under the index "0001". This corresponds to step S2 of FIG. 4.

The GHR unit 22 is shifted one bit to the left, and "1" indicative of branching is inserted into the least significant bit, resulting in "000001". At this point of time, the prediction result and the contents of each register/memory are:
PC=000001, prediction failure,
BTB[0001]=00-1-000011, and GHR:000001.

Here, PC indicates a program counter, and the contents of the BTB are shown as a tag "00", a bias "1", and a branch destination address "000011" in this order.

At the instruction address "000100", access to the BTB unit 25 is made under the index "0100", and a tag miss is detected, resulting in the prediction indicating no branching. As a result of actual execution of the instruction, the branch instruction does not branch, thereby agreeing with the prediction. A tag "00" and a bias "0" are registered in the BTB unit 25 under the index "0100".

The GHR unit 22 is shifted one bit to the left, and "0" indicative of no branching is inserted into the least significant bit, resulting in "000010". At this point of time, the prediction result and the contents of each register/memory are:
PC=000001, prediction success,
BTB[0100]=00-0-******, and GHR:000010.

After this, instructions at the instruction addresses "0005", "0006", "0007", and "0008" do not branch. In the same manner as above, the results are:

PC=000101, prediction success,
BTB[0101]=00-0-\*\*\*\*\*\*, GHR=000100;
PC=000110; prediction success,
BTB[0110]=00-0-\*\*\*\*\*\*, GHR:001000;
PC=000111, prediction success,
BTB[0111]=00-0-\*\*\*\*\*\*, GHR=010000; and
PC=001000, prediction success,
BTB[1000]=00-0-\*\*\*\*\*\*, GHR=100000.

At the instruction address "001100", access to the BTB unit 25 is made under the index "1100", and a tag miss is detected, resulting in the prediction indicating no branching. As a result of actual execution of the instruction, the branch instruction branches, being contrary to the prediction. A tag "00", a bias "1", and a branch destination address "001001" are registered in the BTB unit 25 under the index "1100".

The GHR unit 22 is shifted one bit to the left, and "1" indicative of branching is inserted into the least significant bit, resulting in "000001". At this point of time, the prediction result and the contents of each register/memory are:
PC=001100, prediction failure,
BTB[1100]=00-1-001001, and GHR-000001.

Since the execution of the program has branched to the instruction address "001001", access to the BTB unit 25 under the index "1100" is made again at the instruction address "001100". At this time, a tag hit is detected, and a branch destination address "001001" is obtained. Since the access to the BTB unit 25 provides a tag hit, a check is made as to whether access to the tag-attached PHT unit 23 results in a tag hit. This corresponds to step S3 of FIG. 3.

In detail, access to the tag-attached PHT unit 23 is made by using as an index an Exclusive-OR value "001101" between the address "001100" and the GHR contents "000001". Since a tag check results in a miss, branching to an address "001001" is predicted based on the bias bit of the BTB unit 25. This corresponds to step S4 of FIG. 3. As a result of actual execution of the instruction, the branch instruction branches to "001001", agreeing with the prediction. As in step S6 of FIG. 4, therefore, the BTB unit 25 and the tag-attached PHT unit 23 are not updated. At this point of time, the prediction result and the contents of each register/memory are:
PC=001100, prediction success,
BTB[1100]=00-1-001001 (with no updating),
and GHR=000011.

When a loop is repeated three times by the branch instruction at the instruction address "001100", the results are:
PC=001100, prediction success,
BTB[1100]=00-1-001001 (with no updating),
GHR=000111;
PC=001100, prediction success,
BTB[1100]=00-1-001001   (with   no   updating),
   GHR=001111; and
PC=001100, prediction success,
BTB[1100]=00-1-001001 (with no updating),
GHR=011111.

After repeating the loop six times (branching five times), branching to an address "001001" is predicted in the same manner as before at the instruction address "001100". In this case, since the loop comes to an end at the sixth time, the branch instruction does not branch, not agreeing with the prediction. Consequently, as shown at step S7 of FIG. 4, a tag "1100" and a count value "0" are registered under the index that is an Exclusive-OR value "010011" between the instruction address "001100" and the GHR contents "011111". At this point of time, the prediction result and the contents of each register/memory are:

PC=001100, prediction failure,
PHT[010011]=1100-0, and GHR=111110.

Thereafter, when program execution at the instruction address "001111" branches to an instruction address "000010", the results are:
PC=001111, prediction failure,
BTB[1111]=00-1-000010, and GHR=111101.

After this, instructions at the instruction address "000010" and the following instruction addresses are executed again. This time, the results are:
PC=000100, prediction success (no branching),
BTB and PHT: no update, GHR=111010;
PC=000101, prediction success (no branching),
BTB and PHT: no update, GHR=110100;
PC=000110, prediction success (no branching),
BTB and PHT: no update, GHR=101000;
PC=000111, prediction success (no branching),
BTB and PHT: no update, GHR=010000;
PC=001000, prediction success (no branching),
BTB and PHT: no update, GHR=100000;
PC=001100, prediction success (branch),
BTB and PHT: no update, GHR=000001;
PC=001100, prediction success (branch),
BTB and PHT: no update, GHR=000011;
PC=001100, prediction success (branch),
BTB and PHT: no update, GHR=000111;
PC=001100, prediction success (branch),
BTB and PHT: no update, GHR=001111;
PC=001100, prediction success (branch),
BTB and PHT: no update, GHR=011111; and
PC=001100, prediction success (no branching),
PHT[010011]=1100-0, GHR=111110.

Here, when the branch instruction at the instruction address "001100" is executed at the last run of the loop, no branching is predicted. This is because both the BTB unit 25 and the tag-attached PHT unit 23 hit, and the count value 23b of the tag-attached PHT unit 23 is zero. At the last branch instruction, the results are:
PC=001111, prediction success (branch),
BTB and PHT: no update, and GHR=111101.

In this manner, all the predictions are successful this time.

In executing this program, the branch prediction method according to the present invention uses only one entry in the tag-attached PHT unit 23. In this manner, the branch prediction method of the present invention can achieve a highly accurate prediction even when the memory space of the RAM is rather small.

Figure 1:
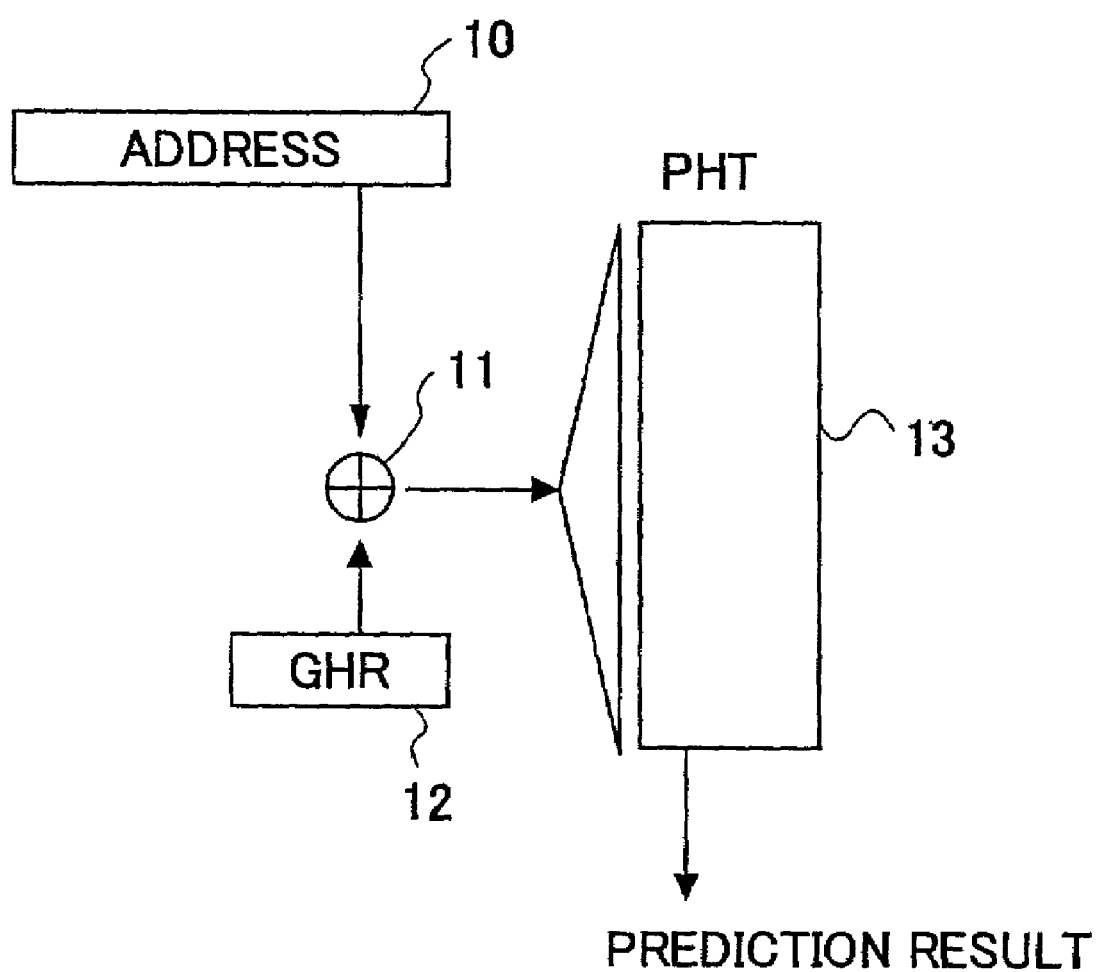
FIG. 1 is a block diagram showing a configuration of a related-art branch prediction mechanism based on the PHT.

It should be noted that the related-art branch prediction method shown in FIG. 1 cannot be successful in all the predictions when executing the instructions at the instruction address "000010" and the following instruction addresses a second time in the above program. This is because there is interference between PHT entries.

Figure 6:
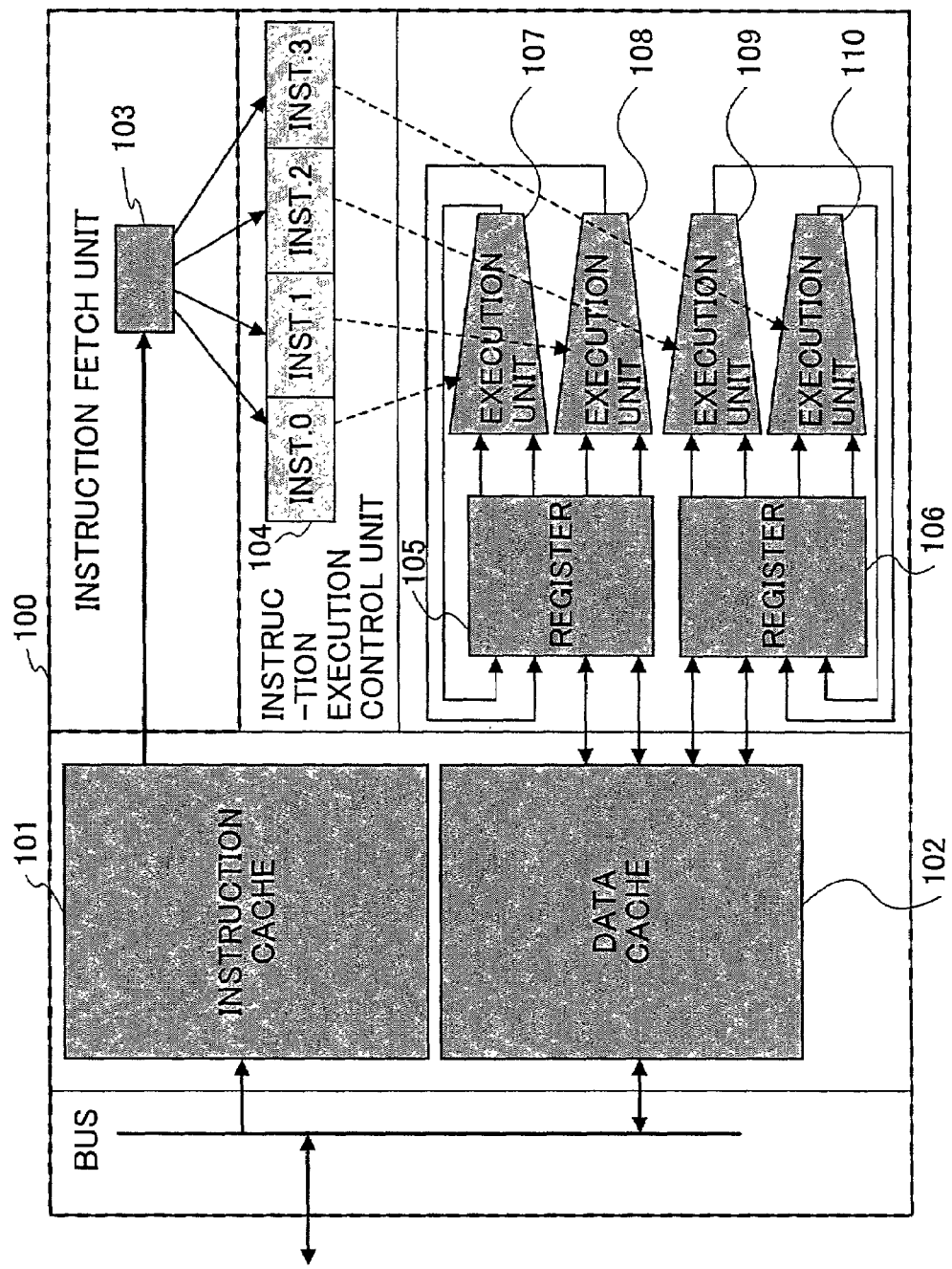
FIG. 6 is a block diagram of a processor that employs the branch prediction apparatus of the present invention.

FIG. 6 is a block diagram of a processor that employs the branch prediction apparatus of the present invention.

A processor 100 of FIG. 6 includes an instruction cache 101, a data cache 102, an instruction fetch unit 103, an instruction execution control unit 104, a register 105, a register 106, and execution units 107 through 110.

The instruction cache 101 and the data cache 102 temporarily store therein instructions and data, respectively. The instruction fetch unit 103 successively fetches instructions from the instruction cache 101 as they are pointed to by the program counter. The instruction execution control unit 104 successively decodes the instructions fetched by the instruction fetch unit 103, and controls the instruction execution according to the decoded results. The register 105, register 106, and execution units 107 through 110 together make up an execution operation unit. The execution operation unit operates under the control of the instruction execution control unit 104, and carries out executions according to instruction. The execution units 107 through 110 execute instructions 0 through 3, respectively, independently of each other, thereby making a configuration that can carry out pipeline operations at high speed.

The branch prediction apparatus according to the present invention shown in FIG. 2 is provided in the instruction fetch unit 103. When there is a branch instruction, the branch prediction apparatus predicts a branch direction, so that an instruction corresponding to the predicted branch direction will be fetched. In the branch prediction according to the present invention, highly accurate branch predictions can be made by avoiding entry interference, so that even when an instruction is fetched based on the prediction before a branch direction is actually determined, there is only a small possibility of miss prediction, thereby making it possible to avoid disturbance in the pipeline operation.

Further, the branch prediction according to the present invention uses the bias bit 25c of the BTB unit 25, so that the time length necessary to make branch outcomes properly learned can be relatively short compared with a related-art case in which a PHT alone is used for branch prediction. The branch prediction according to the present invention is thus capable of coping with situational changes caused by context switches in a short time. In the benchmark jpeg, jbig, mpeg4, ghostscript using a 8-KB RAM, the branch prediction of the present invention attained 96% prediction accuracy.

Further, the present invention is not limited to these embodiments, but various variations and modifications may be made without departing from the scope of the present invention.

The present application is based on Japanese priority application No. 2001-186473 filed on Jun. 20, 2001, with the Japanese Patent Office, the entire contents of which are hereby incorporated by reference.

The invention claimed is:

1. An apparatus for branch prediction, comprising:
    a history register storing history of previous branch instructions;
    an index generation circuit generating a first index from an instruction address and the history stored in said history register;
    a history table storing a tag, which is a predetermined portion of the instruction address, and a first count value indicative of a likelihood of branching in association with the first index, said history table indicating a hit in response to a match between the tag and the predetermined portion of a current instruction address, and indicating a miss in response to a mismatch between the tag and the predetermined portion of the current instruction address;
    a branch destination buffer storing a branch destination address or a predicted branch destination address of an instruction indicated by the instruction address and a second value indicative of a likelihood of branching in association with a second index that is at least a portion of the instruction address; and
    a selection unit making a branch prediction by selecting one of the first value and the second value depending on whether said history table indicates a hit or a miss.

2. The apparatus as claimed in claim 1, wherein said selection unit selects the first value if said branch destination buffer has an entry therein corresponding to a current instruction address and said history table has an entry therein corresponding to the current instruction address and current history, and selects the second value if said branch destination buffer has an entry therein corresponding to the current instruction address and said history table does not have an entry therein corresponding to the current instruction address and the current history.

3. The apparatus as claimed in claim 2, wherein said selection unit makes the branch prediction indicating no branching if said branch destination buffer does not have an entry therein corresponding to the current instruction address.

4. The apparatus as claimed in claim 1, wherein said index generation circuit generates the first index that is an Exclusive-OR between the history stored in said history register and the current instruction address.

5. The apparatus as claimed in claim 1, wherein more than one said history table is provided so as to allow a plurality of entries to be registered with respect to said first index.

6. A processor, comprising:
    a history register storing history of previous branch instructions;
    an index generation circuit generating a first index from an instruction address and the history stored in said history register;
    a history table storing a tag, which is a predetermined portion of the instruction address, and a first count value indicative of a likelihood of branching in association with the first index, said history table indicating a hit in response to a match between the tag and the predetermined portion of a current instruction address, and indicating a miss in response to a mismatch between the tag and the predetermined portion of the current instruction address;
    a branch destination buffer storing a branch destination address of an instruction indicated by the instruction address and a second value indicative of a likelihood of branching in association with a second index that is at least a portion of the instruction address;
    a selection unit making a branch prediction by selecting one of the first value and the second value, depending on whether said history table indicates a hit or a miss;
    an execution control unit controlling execution of instructions; and
    an execution operation unit executing the instructions.

7. A method of branch prediction, comprising:
    storing a tag, which is a predetermined portion of an instruction address, and a first count value indicative of a likelihood of branching in association with a first index that is generated from the instruction address and history of a previous branch instruction, a hit being indicated in response to a match between the tag and the predetermined portion of a current instruction address, and a miss being indicated in response to a mismatch between the tag and the predetermined portion of the current instruction address;
    storing a branch destination address in a branch destination buffer of an instruction indicated by the instruction address and a second value indicative of a likelihood of branching in association with a second index that is at least a portion of the instruction address;
    selecting one of a first value and a second value depending on whether a hit or a miss is indicated; and
    predicting branching in response to the selected one of the first value and the second value.

8. The method as claimed in claim 7, wherein said selecting one of the first value and the second value selects the first value if said branch destination buffer has an entry therein corresponding to a current instruction address and said history table has an entry therein corresponding to the current instruction address and current history, and selects the second value if said branch destination buffer has an entry therein corresponding to the current instruction address and said history table does not have an entry therein corresponding to the current instruction address and the current history.

9. The method as claimed in claim 8, further comprising:
registering the current instruction address in said branch destination buffer if said branch destination buffer does not have an entry therein corresponding to the current instruction address; and
registering information about the current instruction address in the history table if said branch destination buffer has an entry therein corresponding to the current instruction address and said history table does not have an entry therein corresponding to the current instruction address and the current history and if a prediction made based on the second value turns out to be erroneous.

10. The method as claimed in claim 9, wherein the information about the current instruction address is not registered in said history table if said branch destination buffer has an entry therein corresponding to the current instruction address and said history table does not have an entry therein corresponding to the current instruction address and the current history and if the prediction made based on the second value turns out to be correct.

11. An apparatus for branch prediction, comprising:
a history register storing history of immediately preceding branch instructions;
an index generation circuit generating a first index that is an Exclusive-OR between an instruction address and the history stored in said history register;
a history table storing a tag, which is a predetermined portion of the instruction address, and a first count value indicative of a likelihood of branching in association with said first index, said history table indicating a hit in response to a match between the tag and the predetermined portion of a current instruction address, and indicating a miss in response to a mismatch between the tag and the predetermined portion of the current instruction address;
a branch destination buffer storing the portion of the instruction address as the tag, a branch destination address of an instruction indicated by the instruction address, and a second value indicative of a likelihood of branching in association with said second index that is a portion of the instruction address; and
a selection unit making a branch prediction by selecting one of the first value and the second value, depending on whether said history table indicates a hit or a miss, wherein said selection unit selects the first value if said branch destination buffer has an entry therein corresponding to a current instruction address and said history table has an entry therein corresponding to the current instruction address and current history, and selects the second value if said branch destination buffer has an entry therein corresponding to the current instruction address and said history table does not have an entry therein corresponding to the current instruction address and the current history.

* * * * *